April 22, 1969 C. F. BUHRER 3,440,424

OPTICAL SYSTEM FOR TRANSMITTING AND RECEIVING TWO INDEPENDENT SIGNALS OVER A SINGLE ELECTROMAGNETIC CARRIER WHEREIN THE ROTATIONAL ORIENTATION OF THE RECEIVER IS INDEPENDENT OF THE ANGULAR POSITION OF THE TRANSMITTER

Filed July 16, 1964 Sheet 1 of 2

INVENTOR.
CARL F. BUHRER

BY R. J. Frank

ATTORNEY.

INVENTOR.
CARL F. BUHRER

BY

R. J. Frank
ATTORNEY.

United States Patent Office 3,440,424

Patented Apr. 22, 1969

3,440,424
OPTICAL SYSTEM FOR TRANSMITTING AND RECEIVING TWO INDEPENDENT SIGNALS OVER A SINGLE ELECTROMAGNETIC CARRIER WHEREIN THE ROTATIONAL ORIENTATION OF THE RECEIVER IS INDEPENDENT OF THE ANGULAR POSITION OF THE TRANSMITTER

Carl F. Buhrer, West Hempstead, N.Y., assignor to General Telephone and Electronics Laboratories, Inc., a corporation of Delaware Filed July 16, 1964, Ser. No. 383,126
Int. Cl. H04b *9/00;* H01s *3/00*
U.S. Cl. 250—199 3 Claims

ABSTRACT OF THE DISCLOSURE

An optical system for transmitting and receiving two independent signals wherein the rotational orientation of the receiver is independent of the angular position of the transmitter. At the transmitter, voltages proportional to the sum and difference of the signals are applied to a light modulator producing transmission of a circularly polarized carrier having sidebands circularly polarized in the opposite sense such that one signal appears as an upper sideband and the other signal appears as a lower sideband. At the receiver, the beam is split into two components, the components passed through plane polarizers displaced 45° with respect to each other, and detected. The outputs of the detector are phase shifted 90° with respect to each other and applied to a sum and difference matrix which generates two output voltages corresponding respectively to the independent input signals.

This invention relates to signal transmission systems and in particular to a system for modulating an electromagnetic carrier with two independent signals and for separating and detecting these signals at a remote receiver.

The generation of coherent light by optical masers has stimulated interest in light communication systems. Such systems exhibit greater directivity and wider bandwidth capacity than conventional microwave channels. Using these systems, it is possible to have a number of wideband communication links operating without intereference within sight of each other at nearly the same optical wavelength.

In patent application Ser. No. 267,599, filed Mar. 25, 1963 by L. R. Bloom and C. F. Buhrer, now U.S. Patent 3,272,988 granted Sept. 13, 1966, there is described duplex polarization modulation systems in which first and second independent input signals modulate the polarization state of a light beam. The modulated beam is detected at a receiver to provide first and second output signals which correspond to the first and second input signals respectively. However, in these modulation systems, the rotational orientation of the receiver about the beam axis is critical and affects the separation or amplitude of the received signals. Since it is desirable in many applications to have a receiver whose operation is independent of its angular position, it is an object of my invention to provide an optical polarization transmitter and receiver capable of transmitting two signals in such manner that the signal reception is unaffected by the receiver orientation.

Another object is to provide a system for modulating a light beam in which substantially all of the input light energy appears at the output of the modulator.

Still another object is to provide a signal transmission system in which a continuous beam of light is available for alignment of the transmitter and receiver.

As is well known, electric and magnetic fields may be employed to change the dielectric constants of many media. In some of these media, application of an electric or magnetic field causes an anisotropy to be set up such that beams (or waves) of electromagnetic radiation, with the same direction of propagation but different directions of polarization, travel through the media at different velocities. In particular, there will be one direction of polarization, known as the fast direction, for which the beam velocity is a maximum, while for the polarization perpendicular to this, the "slow" direction, the velocity of the beam will be a minimum. If beams of these two different polarizations start moving through the medium together, the one with the slow direction of polarization will be shifted in time phase or retarded with respect to the other. The amount of this retardation due to induced birefringence in the medium is approximately proportional to the field strength as well as to the path length in the medium.

In the present invention, a circularly polarized carrier is transmitted with sidebands circularly polarized in the opposite sense such that a first independent input signal A appears only as an upper sideband while a second independent input signal B appears only as a lower sideband. The first and second input signals are applied to a matrix having a first output voltage consisting of the sum of the signals and a second output voltage consisting of the difference between the signals. The time phases of the first and second output signals are shifted 90° with respect to each other and applied to first and second pairs of input connections respectively of a modulator consisting of one or more units of a medium having the characteristics described above.

A circularly polarized beam of light directed through the medium in modulated by the phase shifted sum and difference voltages and transmitted to a remote receiver. This received signal consists of the circularly polarized carrier and upper and lower sidebands circularly polarized in the opposite sense from the carrier, each sideband containing one of the two input signals. At the receiver, the beam is split into two beam components by a beam splitter. Each component is then passed through plane polarizers, which are displaced by 45° with respect to each other, to first and second photodetectors. The outputs of the photodetectors are phase shifted 90° in time with respect to each other and applied to a second matrix which generates first and second output signals equal to the sum and difference respectively of the signals applied thereto. These output signals correspond to the input signals applied to the transmitter except that they are displaced in phase by an angle determined by the relative rotational orientations of the transmitter and receiver. Rotation of the entire receiver about the beam axis is equivalent to merely changing the phase angle and therefore affects neither the frequency separation between the signals or the amplitudes of the signals.

One class of devices which may be used to modulate the polarized light beam comprises crystals of electro-optic materials; i.e. materials in which the desired variation of light velocity with polarization direction is produced by an electric field. In one type of electro-optic crystal an electric field perpendicular to the direction of light propagation produces a retardation of light polarized in the fast direction with respect to light polarized in the slow direction. This retardation is proportional to the field strength and to the length of the light path in the crystal. Such a crystal is said to exhibit a dual transverse electro-optic effect and has a 3-fold rotation axis in its point group.

In some crystals of this type, the 3-fold rotation axis in the point group corresponds to a 3-fold rotation axis in the crystal; in others it corresponds to a 3-fold screw axis in the crystals. A 3-fold rotation axis may be defined as an axis of symmetry existing in a crystal such that, after rotation about the axis through 120°, the crystal assumes a congruent position. A crystal with a 3-fold screw axis assumes a congruent position when the 120° rotation is advanced by a translation along the axis of rotation. A point group is one of the 32 crystallographically permissible symmetries involving sets of rotation axes and planes of symmetry all of which intersect in a common point. Further information on the geometrical features of crystals and the notation used to describe them may be obtained by reference to the textbook "Elementary Crystallography" by M. J. Buerger, published by John Wiley & Sons, Inc., New York, 1956.

The polarized light beam is directed through the electro-optic crystal in a direction parallel to a 3-fold symmetry axis. A first pair of electrodes extending parallel to the 3-fold axis is secured to opposite sides of the crystal and a second pair of electrodes extending parallel to the 3-fold axis is affixed to opposite sides of the crystal midway between the first pair of electrodes. A first voltage consisting of the sum of the two independently varying input signals is applied directly across the first pair of electrodes, and a second voltage consisting of the difference between the two input signals phase shifted by 90° is applied across the second pair of electrodes. Passage of polarized light through the energized electro-optic crystal does not alter its total intensity but does modulate the polarization state of the beam.

Another type of electro-optic crystal which may be used to produce polarization modulation of a light beam is potassium dihydrogen phosphate ($KH_2PO_4$) which is of tetragonal structure and therefore optically uniaxial. In a modulator using crystals of this type, the matrix output voltages corresponding to the sum and difference of the input signals are applied directly to first and second suitably oriented crystals to produce electric fields parallel to the light beam and along the optic axes of the crystals.

Another type of modulator utilizes Faraday rotator cells and is responsive to signals which produce magnetic fields across the cells in the direction of light propagation.

The above objects of and the brief introduction to the present invention will be more fully understood and further objects and advantages will become apparent from a study of the following description in connection with the drawings, wherein:

FIG. 1*a* is a perspective schematic diagram depicting a dual polarization modulation transmission system and FIG. 1*b* is an end view of the single crystal modulator used in the system of FIG. 1*a*.

Figures 1A, 1B:
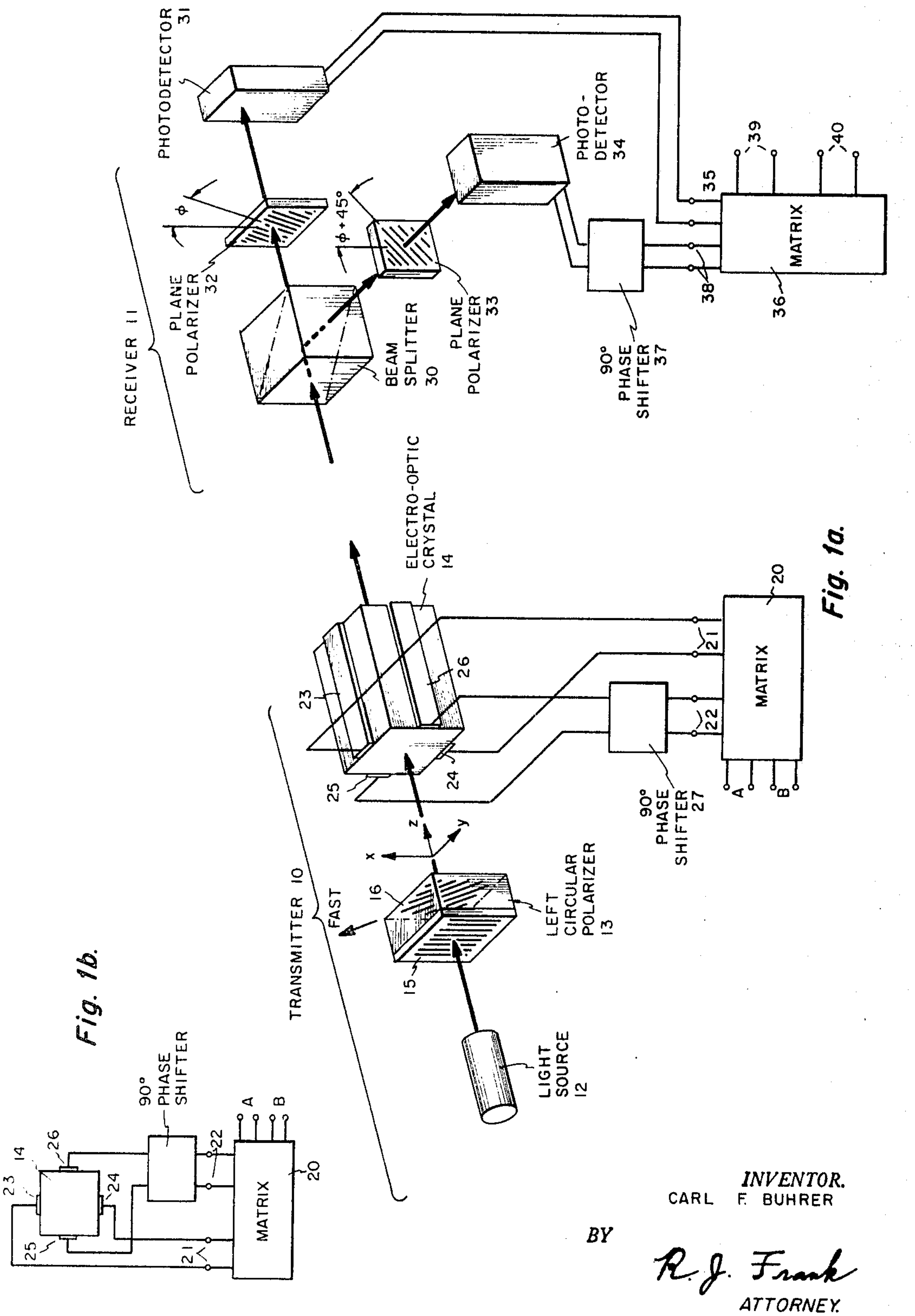

Referring to FIG. 1*a*, there is shown a diagram of a transmission system comprising a transmitter 10 for modulating a beam of polarized radiation by two independently varying signals and a receiver 11 for separating and detecting these signals. The transmitter 10 includes a light source 12, a left-circular polarizer 13, and an electro-optic crystal 14. Source 12 may be any non-coherent light source such as a sodium vapor lamp. Alternatively, a coherent light source such as an optical maser may be used, a gaseous type suitable for this application being described in detail in copending patent application Ser. No. 200,239, filed June 5, 1962, by Kenneth D. Earley et al., now U.S. Patent 3,183,937 granted May 18, 1965.

The light from source 12 is propagated in the $+z$ direction through left-circular polarizer 13 which consists of a plane polarizer 15 positioned to transmit light with its electric vector oriented along the $x$ axis in the transverse $x$–$y$ plane and a quarter-wave birefringent plate 16 having its fast polarization direction in the $x$–$y$ plane in a direction at 45° to the $-x$ and $+y$ axes. (It shall be noted that if the light emitted by the optical maser is plane polarized, a quarter-wave birefringent plate may be substituted for the circular polarizer 13.)

Plane polarizer 15 may be made of any material exhibiting dichroism such as tourmaline or Polariod. The quarter-wave birefringent plate 16 may consist of a thin sheet of split mica or quartz cut parallel to its optic axes and having a thickness which produces a 90° relative phase shift between light components in the $x$–$y$ plane at +45° and −45° from the $x$ axis. With the described orientation of plane polarizer 15 and birefringent plate 16, the light entering electro-optic crystal 14 is circularly polarized in the left-hand direction; i.e. looking toward polarizer 13 from crystal 14 the electric vector of the electromagnetic wave rotates counter-clockwise as the light is propagated in the $+z$ direction.

Electro-optic crystal 14 has a 3-fold symmetry axis extending in the direction of light propagation $+z$. As has been explained, light propagating in a given direction through the crystal under the influence of an electric field has a velocity which is dependent upon the direction of polarization of the light. The polarization direction for which the light has a maximum velocity (the fast direction) is that in which the refractive index of the crystal is a minimum, and the direction for which the light has a minimum velocity (the slow direction) is that in which the refractive index is a maximum. These directions are at right angles to each other and are perpendicular to the direction of light propagation.

Crystal 14 may be made of any optically transparent material such as sphalerite zinc sulphide (ZnS) which contains a 3-fold rotation axis in its point group and which exhibits a transverse linear electro-optic effect upon light traveling along this axis. Crystal classes whose symmetry elements include one or more 3-fold rotation axes occur in the cubic, hexagonal and trigonal systems.

In cubic crystals, the [111] directions are 3-fold rotation axes. Using the symbols employed in the International Union of Crystallography by the Kynock Press, Birmingham (England) (1952), cubic crystals belonging to point group 23 and $\bar{4}3m$ can exhibit the desired electro-optic behavior. Cubic crystals are optically isotropic and therefore when no field is applied they are not birefringent for any direction of light propagation.

The other classes of crsytals, i.e. point groups, possessing 3-fold rotation axes are uniaxial with the optic axes parallel to the 3-fold axis. These classes comprise the two hexagonal point groups $\bar{6}$ and $\bar{6}m2$, each characterized by a 6-fold inversion axis which includes a 3-fold rotation axis. In addition, all non-centrosymmetric classes of the trigonal system, 3, 32, and 3m, may be employed.

A first independently varying signal voltage A is connected to a first input of a sum and difference matrix 20 and a second independently varying signal voltage B is connected to a second input of the matrix. Matrix 20 provides a first output voltage equal to the sum of the input signals and a second output voltage equal to the difference between the input signals. More specifically, if the first input signal A has the form $$e_a = E_a \sin \omega_a t$$

and the second input signal B has the form $$e_b = E_b \sin \omega_b t$$

where $E_a$ and $E_b$ are the amplitudes and $\omega_a$ and $\omega_b$ the frequencies of $e_a$ and $e_b$ respectively, and $t$ is time, the voltage appearing across output terminals 21 will be $$e_a + e_b = E_a \sin \omega_a t + E_b \sin \omega_b t$$

and that across output terminals 22, $$e_a-e_b=E_a\sin\omega_a t-E_b\sin\omega_b t$$

The sum voltage $e_a+e_b$ is connected directly across longitudinally extending electrodes 23 and 24 located on opposite sides of crystal 14 (see FIG. 1*b*) and the difference voltage $e_a-e_b$ is applied across longitudinally extending electrodes 25 and 26 after being phase shifted 90° by phase shifter 27. (It shall be noted that it is only necessary that the angular difference between the vltage applied across electrodes 23, 24 and that applied across electrodes 25, 26 be shifted 90° and not that the total phase shift be applied to the difference signal as shown.)

Since the light from source 12 is left-circularly polarized and the beam impinging on electro-optic crystal 14 has electric field components $E_x$ and $E_y$ in the $x$ and $y$ directions respectively, $$E_x=E_c\cos\omega_c t$$

and $$E_y=E_c\sin\omega_c t$$

where $E_c$ is the amplitude and $\omega_c$ is the frequency of the carrier.

The voltages applied to crystal 14 modulate the circularly polarized light carrier so that the light emerging from crystal 14 may be expressed as $$E_x=E_c\left[\cos\omega_c t\cos P/2+\frac{k\sin P/2}{P/2}\left(\frac{E_a}{w}\cos(\omega_c-\omega_a)t-\frac{E_b}{w}\cos(\omega_c+\omega_b)t\right)\right]$$

and $$E_y=E_c\left[\sin\omega_c t\cos P/2+\frac{k\sin P/2}{P/2}\left(\frac{-E_a}{w}\sin(\omega_c-\omega_a)t+\frac{E_b}{w}\sin(\omega_c+(\omega_b)t\right)\right]$$

where $$k=\frac{\pi d n_0^3\bar{r}}{\lambda}$$

$d$ is the length of crystal 14, $w$ is its effective width and height $n_n$ is the index of refraction of the crystal, $\bar{r}$ the electro-optic constant of the crystal, $\lambda$ the wave-length in free space, and $P/2$ equals $k$ multiplied by the magnitude of the total electric field transverse to the direction of propagation of the light beam.

For small signals $P/2$ is small and both $\cos P/2$ and $$\frac{\sin P/2}{P/2}$$

approach unity.

Examination of the equations for the $x$ and $y$ electric field components emerging from crystal 14 shows that the signal has a left circularly polarized carrier with right circularly polarized sidebands, signal A appearing only as a lower sideband and signal B only as an upper sideband.

At the receiver 11, the optical beam is divided into two light components by beam splitter 30. The first light component is transmitted to a first photodetector 31 through a plane polarizer 32 oriented at an angle $\phi$ from the $x$ axis. The second light component is sent through a plane polarizer 33 oriented at an angle $\phi+45°$ from the $x$ axis (as shown in FIG. 1*a*) to a second photodetector 34.

The light impinging on photodetector 31 may be represented by $$E_\phi=E_x\cos_\phi+E_y\sin_\phi.$$

When this is detected an output voltage proportional to the time average intensity $\overline{E_\phi^2}$ is obtained at input terminals 35 of a sum and difference matrix 36 which is similar to matrix 20 at the transmitter. This value may be expressed as $$\overline{E_\phi^2}=E_c^2\left[1/2+\frac{k\sin P}{P}\left\{\frac{E_a}{w}(\cos 2\phi\cos\omega_a t+\sin 2\phi\sin\omega_a t)+\frac{E_b}{w}(-\cos 2\phi\cos\omega_b t+\sin 2\phi\sin\omega_b t)\right\}\right]$$

Similarly, the output of photodetector 34 is $$\overline{E^2_{\phi+45°}}=E_c^2\left[1/2+\frac{k\sin P}{P}\left\{\frac{E_a}{w}(-\sin 2\phi\cos\omega_a t+\cos 2\phi\sin\omega_a t)+\frac{E_b}{\omega}(\sin 2\phi\cos\omega_b t+\cos 2\phi\sin\omega_b t)\right\}\right]$$

This signal is then phase shifted 90° by phase shifter 37 producing a voltage at input terminal 38 of sum and difference matrix 36 equal to $$E_c^2\left[1/2+\frac{k\sin P}{P}\left\{\frac{E_a}{w}(\sin 2\phi\sin\omega_a t+\cos 2\phi\cos\omega_a t)+\frac{E_b}{w}(-\sin 2\phi\sin\omega_b t+\cos 2\phi\cos\omega_b t)\right\}\right]$$

The voltage across terminals 35 and 38 are combined in matrix 36 to produce a first output voltage across terminals 39 equal to the sum of the first and second photodetector voltages and a second output voltage across terminal 40 equal to the difference between the first and second photodetector voltages. More specifically, the sum voltage across terminals 39 is $$\frac{2E_c^2kE_a\sin P}{wP}\cos(\omega_a t-2\phi)$$

and the difference voltage across terminals 40 is $$\frac{2E_c^2kE_b\sin P}{wP}\cos(\omega_b t+2\phi)$$

Thus, the outputs across terminals 39 and 40 of matrix 37 correspond to the input signals A and B respectively except for a phase displacement $2\phi$. Intermodulation and cross talk between the two channels is due only to the term $$\frac{\sin P}{P}$$

in the outputs and such distortion products are down in power from the desired signals by $$20\log\left(1-\frac{\sin P}{P}\right)\text{ decibels}$$

Figure 2:
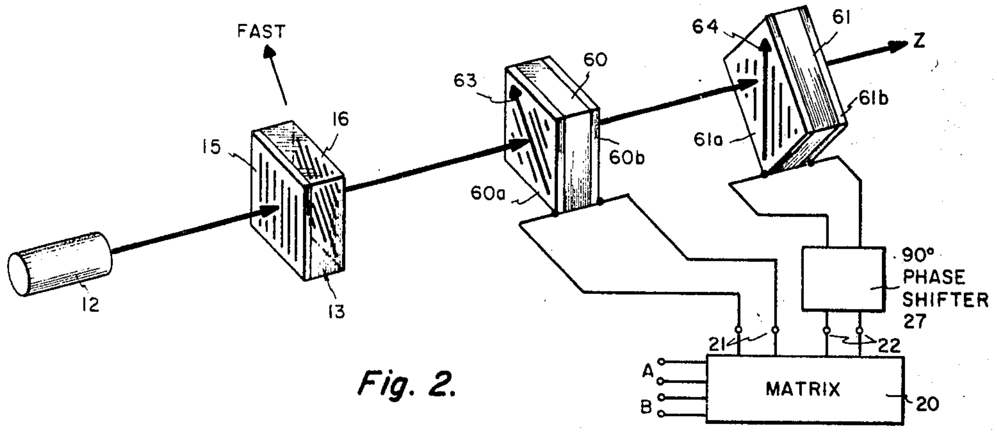
FIG. 2 is a schematic diagram of a transmitter in which the single crystal modulator of FIG. 1*a* has been replaced by two crystals.

FIG. 2 illustrates a modification of the transmitter shown in FIG. 1*a* in which two optically uniaxial potassium dihydrogen phosphate ($KH_2PO_4$) crystals 60 and 61 are oriented so that the light emerging from circular porarizer 13 is propagated along their [001] optic axis. Electrodes 60*a* and 60*b* are secured to opposite faces of crystal 60 and electrodes 61*a* and 61*b* are secured to opposite faces of crystal 61. The voltage appearing across terminals 21 equal to the sum of the input signals A and B is connected directly to electrodes 60*a* and 60*b* and the output of 90° phase shifter 27 is connected to electrodes 61*a* and 61*b*. Circular polarizer 13 may have any orientation normal to the $z$ axis. The induced polarization direction [110 or 1$\bar{1}$0] (shown by arrows 63 and 64) of crystals 60 and 61 are displaced 45° about the $z$ axis. With signal sources A and B varying independently, the light emerging from crystal 61 comprises a polarization modulated circularly polarized carrier having one sideband containing only signal A and the other sideband containing only signal B.

Figure 3:
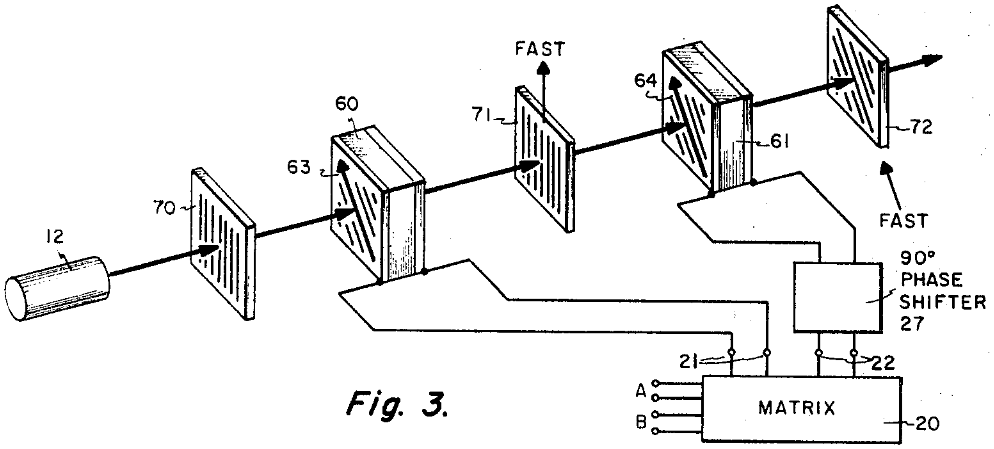
FIG. 3 illustrates a modification of the transmitter of FIG. 2.

FIG. 3 depicts a modification of the transmitter of FIG. 2. In this form of the transmitter, the fast polarization directions 63 and 64 of crystals 60 and 61 are each oriented at 45° to the polarization axis of plane polarizer 70. A quarter-wave plate 71 having its fast axis parallel to the polarization direction of plane polarizer 70 is interposed between crystals 60 and 61 and a quarter-wave plate 72 having its fast axis at 45° to the polarization direction of plane polarizer 70 is placed at the output of crystal 61. With signal sources A and B varying independently, the light emerging from quarter-wave plate 72 consists of a polarization modulated circularly polarized carrier having one sideband containing signal A and the other sideband containing signal B.

Figure 4:
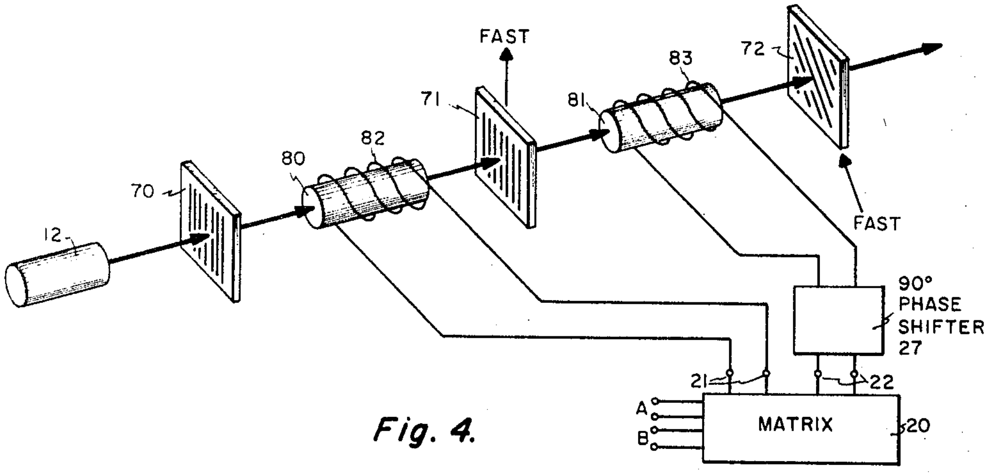
FIG. 4 shows a modification of the transmitter of FIG. 3 in which the electro-optic crystals have been replaced by Faraday cells.

In FIG. 4 there is shown a transmitter similar to that depicted in FIG. 3 except that the electro-optic crystals 60 and 61 have been replaced by two Faraday rotator cells 80 and 81. These Faraday cells consist of a material, such as a lead glass, having a high Verdet constant.

Currents proportional to the sum and difference of the input signals A and B flow through windings 82 and 83 respectively causing a magnetic field to be produced along the light beam direction. These magnetic fields produce a polarization modulated carrier having sidebands corresponding to the A and B input signals as in the case of the system shown in FIGS. 1–3. The rotational orientation of the Faraday cells 80 and 81 about the beam axis is arbitrary.

As many changes could be made in the above constructions and many different embodiments could be made without departing from the scope thereof, it is intended that all matter contained in the above description or shown in the accompanying drawings shall be interpreted as illustrative and not in a limiting sense.

What is claimed is:

1. A signal transmission system for modulating a circularly polarized beam of electromagnetic radiation by first and second independent signals and for detecting said signals, said system comprising:

(a) modulation means positioned in the path of said polarized beam of electromagnetic radiation, said modulation means having first and second pairs of input connections, (b) a first sum and difference matrix having first and second pairs of input terminals for receiving first and second independent input signals and first and second pairs of output terminals, the voltages across said first and second pairs of output terminals corresponding to the sum and difference respectively of said first and second independent signals, (c) means coupling the output terminals of said matrix to the input connections of said modulation means, said means producing a phase displacement between the voltages applied to the first and second pairs of input connections of said modulation means of substantially 90°, the radiation emerging from said modulator having first and second circularly polarized sidebands containing said first and second independent input signals respectively, the direction of polarization of said first and second sidebands being opposite that of said circularly polarized beam of electromagnetic radiation, (d) means for receiving the beam of circularly polarized radiation emerging from said modulation means comprising:

(1) means for dividing said beam into first and second beam components, (2) first and second plane polarizers positioned directly in the paths of said first and second beam components respectively, said first plane polarizer having a direction of polarization substantially 45° from that of said second plane polarizer, (3) first and second photodetectors positioned in the paths of the beams emerging from said first and second plane polarizers respectively, (4) a second sum and difference matrix having first and second inputs and first and second outputs, and (5) means coupling the outputs of said photodetector to the inputs of said second matrix, said means producing phase displacements of the voltages applied to the first and second inputs of said second matrix which differ by substantially 90°, the voltages appearing at the first and second outputs of said second matrix corresponding to said first and second independent input signals respectively, the rotational orientation of said receiving means being independent of the rotational orientation of said modulation means.

2. A signal transmission system for modulating a circularly polarized input light beam by first and second independent signals and for detecting said signals, said system comprising:

(a) an electro-optic crystal having a 3-fold rotation axis in its point group, said beam being directed through said crystal parallel to said axis, (b) first, second, third and fourth electrodes affixed to the surface of said crystal, said electrodes extending in a direction parallel to the 3-fold rotation axis and being symmertically disposed thereabout, (c) a matrix having first and second pairs of input terminals for receiving first and second independent input signals and first and second pairs of output terminals, the voltages across said first and second pairs of output terminals corresponding to the sum and difference respectively of said first and second independent signals, (d) means coupling the output terminals of said matrix to the input connections of said modulation means, said means producing a phase displacement between the voltages applied to the first and second pairs of input connections of said modulation means of substantially 90°, the light beam emerging from said modulator having first and second circularly polarized sidebands containing said first and second independent input signals respectively, the direction of polarization of said first and second sidebands being opposite that of said circularly polarized input light beam, and (e) means for receiving the beam of circularly polarized light emerging from said electro-optic crystal comprising (1) means for dividing said beam into first and second beam components, (2) first and second plane polarizers positioned directly in the paths of said first and second beam components respectively, said first plane polarizer having a direction of polarization substantially 45° from that of said second plane polarizer, (3) first and second photodetectors positioned in the paths of the beams emerging from said first and second plane polarizers respectively, (4) a second sum and difference matrix having first and second inputs and first and second outputs, and (5) means coupling the outputs of said photodetector to the inputs of said second matrix, said means producing phase displacements of the voltages applied to the first and second inputs of said second matrix which differ by substantially 90°, the voltages appearing at the first and second outputs of said second matrix corresponding to said first and second independent input signals respectively, the rotational orientation of said receiving means being independent of the rotational orientation of said modulation means.

3. A signal transmission system for modulating an input light beam by first and second independent input signals and for detecting said signals, said system comprising:

(a) a light source, (b) circularly polarizing means, said means circularly polarizing the light beam emitted by said light source.

(c) an electro-optic crystal having a 3-fold rotation axis in its point group, said beam being directed through said crystal parallel to said axis, (d) first, second, third and fourth electrodes affixed to the surface of said crystal, said electrodes extending in a direction parallel to the 3-fold rotation axis and being symmetrically disposed thereabout, (e) a first sum and difference matrix having first and second pairs of input terminals for receiving first and second independent input signals and first and second pairs of output terminals, the voltages across said first and second pairs of output terminals corresponding to the sum and difference respectively of said first and second independent signals, (f) means coupling the first pair of output terminals of said matrix to the first and second electrodes of said electro-optic crystal, (g) first phase-shifting means coupling the second pair of output terminals of said matrix to the third and fourth electrodes of said electro-optic crystal, said first phase shifting means producing a phase displacement between the voltages applied across the first and second electrodes and across the third and fourth electrodes of said electro-optic crystal of substantially 90°, the light beam emerging from said crystal having a first circularly polarized sideband containing said first independent input signal and having a second circularly polarized sideband containing said second independent input signal, and (h) means for receiving the circularly polarized beam of light emerging from said crystal comprising (1) a beam splitter for dividing said beam into first and second beam components, (2) first and second plane polarizers positioned directly in the paths of said first and second beam components respectively, said first plane polarizer having a direction of polarization substantially 45° from that of said second plane polarizer, (3) first and second photodetectors positioned in the paths of the beams emerging from said first and second plane polarizers respectively, (4) a second sum and difference matrix having first and second pairs of input terminals and first and second pairs of output terminals, (5) means coupling the output of said first photodetector to the first pair of input terminals of said second matrix, and (6) second phase shifting means coupling the second output of said second photodetector to the second pair of input terminals of said second matrix, said second phase shifting means producing phase displacements of the voltages applied across the first and second input terminals of said second matrix which differ by substantially 90°, the voltages appearing at the first and second outputs of said second matrix corresponding to said first and second independent input signals respectively, the rotational orientation of said receving means being independent of the rotational orientation of said modulation means.

References Cited

UNITED STATES PATENTS

| | | | |
|---|---|---|---|
| 3,122,610 | 2/1964 | Csicsatka | 179—15 |
| 3,215,840 | 11/1965 | Buhrer | 250—199 |
| 3,239,671 | 3/1966 | Buhrer | 250—199 |
| 3,272,988 | 9/1966 | Bloom et al. | 250—199 |

OTHER REFERENCES

McDermott, Space/Aeronoutics, June 1963, pp. 98–160, 250–199.

C. F. Buhrer, L. R. Bloom, and D. H. Baird: Applied Optics, Electro-Optic Light Modulation With Cubic Crystals, pp. 840–846, vol. 2, No. 8, August 1963.

ROBERT L. GRIFFIN, *Primary Examiner.*

A. J. MAYER, *Assistant Examiner.*

U.S. Cl. X.R.

332—7.51